July 11, 1933. J. Y. BLAZEK 1,917,748
LATHE ATTACHMENT
Filed Dec. 5, 1931 2 Sheets-Sheet 2
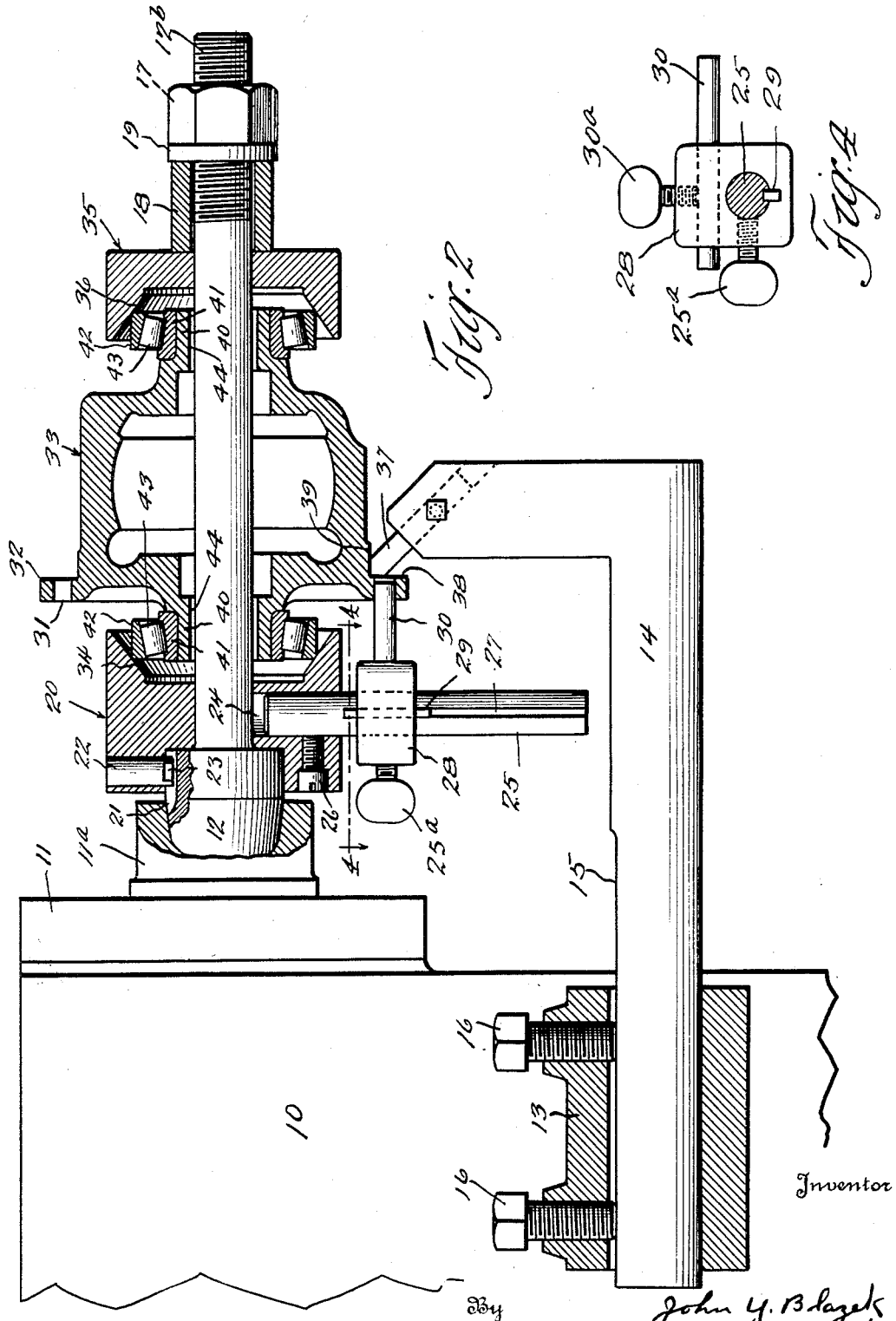

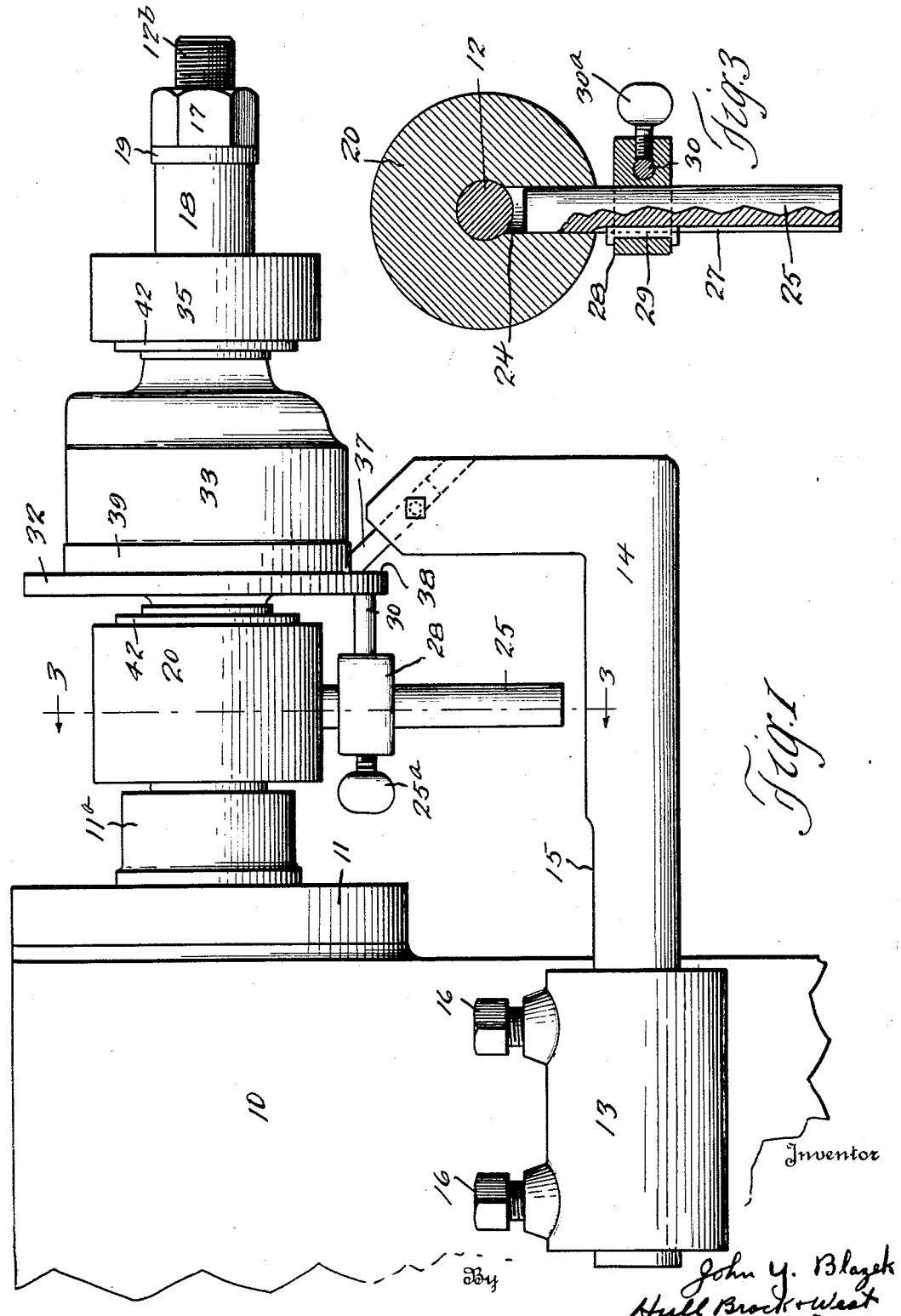

Patented July 11, 1933

1,917,748

UNITED STATES PATENT OFFICE

JOHN Y. BLAZEK, OF CLEVELAND, OHIO, ASSIGNOR TO LEMPCO PRODUCTS, INC., OF CLEVELAND, OHIO, A CORPORATION OF OHIO

LATHE ATTACHMENT

Application filed December 5, 1931. Serial No. 579,242.

This invention relates to a lathe or more accurately an attachment for a lathe of the type more usually employed for truing brake drums and designed to enable the truing of a new or disaligned differential housing without making it necessary for the service station owner to maintain a special lathe for the purpose or any lathe other than that maintained for the more common use of machining brake drums.

Accordingly, the principal object of my invention is to provide an attachment for a brake drum lathe adapted for accurately machining a differential housing or similar machine part. A further object is to provide such a device which shall be exceedingly simple, which will accurately position the said housing, which is adaptable for use in connection with numerous sizes of differential housing and which engages the bearings of such housing whereby to machine the flange in perfectly proper alignment with such bearings.

I attain the foregoing and other and more limited objects in and through the mechanism hereinafter described and illustrated in the accompanying drawings wherein Fig. 1 is a front elevation and Fig. 2 is a fragmentary sectional view showing an attachment for a brake drum lathe and so much of said lathe as cooperates with the attachment. Fig. 3 is a section on the line 3—3 of Fig. 1, and Fig. 4 is a section on the line 4—4 of Fig. 2.

In the accompanying drawings I have illustrated a brake drum lathe in connection with which my improved attachment is employed, indicating the same by the numeral 10. The particular construction of this lathe is not indicated, forming per se no part of the present invention. Of this it is sufficient to say that a bearing portion 11 extends from the lathe 10 and has journaled therein a rotatable member 11ᵃ which carries a spindle 12. The lathe also carries a tool post 13 in which is movably supported a tool holder 14. The tool holder 14 has a flatted side, as shown at 15, with which a pair of set screws 16 engage to prevent rotation. While the tool holder 14 has for convenience of illustration been shown as below the spindle 12, in actual practice it is preferably placed on a level therewith and the tool post 13 projects from the top of the lathe instead of from the side as here shown.

The spindle 12 has as indicated an enlarged portion adjacent the member 11ᵃ and terminates in a longer reduced portion provided with a threaded outer end 12ᵇ upon which may be received a clamping nut 17 as well as a sleeve 18 and a washer 19. Received on the spindle 12 is a main work holder 20 having a bore therethrough of a size to receive the portion 12ᵃ of the spindle 12 as well as an enlarged countersunk portion adapted to receive a small part of the enlarged portion thereof. Extending through the member 20 and received into a keyway 21 in the spindle 12 is a pin 22 having a flatted end 23 cooperating with said keyway. This pin 22 serves to cause rotation of the member 20 with the spindle 12. A bore 24 extends into the member 20 and receives a bar 25. The bar 25 is secured to the member 20 by a set screw 26 and is provided with a spline 27 extending substantially the full length of the exposed portion thereof. A block 28 is slidable on the bar 25 and is provided with a fixed key 29 which slides in the spline 27 whereby to prevent rotation with respect to the bar 25. Also extending through the block 28 is a pin 30 which is adapted to enter an opening 31 in the flange 32 of the differential housing 33. Suitable thumb screws 25ᵃ and 30ᵃ are provided for clamping the members 25 and 30 respectively. The main work support 20 is provided with a frusto-conical concavity 34 in the face thereof most remote from the bearing 11.

Also received on the spindle 12 is an auxiliary work support 35 provided with a similar frusto-conical concavity 36. The tool holder 14 carries a suitable tool 37 adapted to make suitable cuts on the surfaces 38 and 39 which contact the ring gear (not shown).

The differential housing 33, shown by way of example, is provided with extensions 40 upon which are received bearing races 41 and 42 carrying bearings 43. It will be noted that the members 20 and 35 clamp the differential housing by its own bearings, as clearly indicated. By this means I am able to position the differential housing accurately for making the cut. This manner of clamping is vastly superior to that heretofore employed which consisted in holding members engaging in the openings in the extensions 40, inasmuch as in practice the inner surfaces 44 of these extensions are not always finished.

It is within the contemplation of my invention to employ members similar to those 20 and 35 suitably supported on the head stock and tail stock, respectively, of an ordinary general purpose lathe since the present fixture in the particular embodiment disclosed is adapted especially for a brake drum lathe, and certain important features of my invention can be realized by proper adaptation to such general purpose lathe.

Having thus described my invention, what I claim is:

1. In a lathe, a supporting bearing, a spindle rotatable with respect thereto and having a portion extending therefrom, said portion being unsupported beyond said bearing, a pair of spaced work engaging members on said spindle adapted to engage the bearings of a differential housing or similar external-bearing-equipped member having an opening which will receive said spindle and permit said bearings to assume a coaxial relation thereto, and a tool holder adapted for holding a tool in cutting relation to said differential housing.

2. In a lathe, a supporting bearing, a spindle rotatable with respect thereto and having a portion extending therefrom, said portion being unsupported beyond said bearing, a pair of spaced work engaging members on said spindle adapted to engage the bearings of a differential housing or similar external-bearing-equipped member having an opening which will receive said spindle and permit said bearings to assume a coaxial relation thereto, and a tool holder adapted for holding a tool in cutting relation to said differential housing, said work engaging members having frusto-conical depressions facing toward each other for engaging the differential housing bearings and centering them with respect to the axis of rotation of said spindle.

3. In a lathe, a supporting bearing, a spindle rotatable with respect thereto and having a portion extending therefrom, said portion being unsupported beyond said bearing, a pair of spaced work engaging members on said spindle adapted to engage the bearings of a differential housing or similar external-bearing-equipped member having an opening which will receive said spindle and permit said bearings to assume a coaxial relation thereto, and a tool holder adapted for holding a tool in cutting relation to said differential housing, said work engaging members having frusto-conical depressions facing toward each other for engaging the differential housing bearings and centering them with respect to the axis of rotation of said spindle, and one of said work engaging members being provided with means for preventing its rotation with respect to said spindle and means for engaging said differential housing to cause it to rotate.

4. In a lathe for truing differential housings which have central axial openings and external end bearings substantially coaxial with said openings, a supporting bearing, a spindle of a diameter slightly less than that of said openings rotatable with respect to said bearing and having a portion extending therefrom, said portion being unsupported beyond said bearing, a pair of spaced work engaging members on said spindle adapted to engage said external bearings of said differential housing, said members being provided with frusto-conical concavities adapted to engage said bearings, a tool holder for holding a tool in cutting relation to said differential housing, and means for causing such differential housing to rotate with respect to said cutting tool.

In testimony whereof, I hereunto affix my signature.

JOHN Y. BLAZEK.